(12) United States Patent
Offermann et al.

(10) Patent No.: US 7,135,219 B2
(45) Date of Patent: Nov. 14, 2006

(54) LAMINATED GLASS SHEET WITH A LAMINATED FILM

(75) Inventors: Volkmar Offermann, Eschweiler (DE); Walter Goerenz, Wuerselen (DE); Ludwig Linden, Aachen (DE); Michael Steffens, Stolberg (DE); Heinz Schilde, Wuerselen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/512,071

(22) PCT Filed: May 7, 2003

(86) PCT No.: PCT/FR03/01418

§ 371 (c)(1), (2), (4) Date: Apr. 22, 2005

(87) PCT Pub. No.: WO03/099553

PCT Pub. Date: Dec. 4, 2003

(65) Prior Publication Data

US 2005/0233136 A1    Oct. 20, 2005

(30) Foreign Application Priority Data

May 7, 2002    (DE) ................ 102 20 299

(51) Int. Cl.
B32B 7/02 (2006.01)
B32B 7/12 (2006.01)
B32B 27/08 (2006.01)
B32B 27/30 (2006.01)
B32B 27/36 (2006.01)

(52) U.S. Cl. .......... 428/212; 428/213; 428/214; 428/201; 428/203; 428/204; 428/206; 428/207; 428/337; 428/339; 428/426; 428/441; 428/442; 428/457; 428/458; 428/480; 428/483; 428/515; 428/520; 428/522; 428/523; 428/430

(58) Field of Classification Search ............ None
See application file for complete search history.

(56) References Cited

U.S. PATENT DOCUMENTS

| | | | |
|---|---|---|---|
| 3,622,440 A * | 11/1971 | Snedeker et al. .......... 428/429 |
| 3,630,809 A * | 12/1971 | Edwards .................... 428/336 |
| 3,923,757 A * | 12/1975 | Salyer et al. ................ 525/60 |
| 3,952,135 A * | 4/1976 | Priddle et al. .............. 428/442 |
| 4,427,743 A * | 1/1984 | Katsuki et al. ........... 428/424.6 |
| 4,591,525 A * | 5/1986 | Cass ...................... 428/195.1 |
| 4,797,317 A * | 1/1989 | Oliver et al. ............... 428/204 |
| 4,816,096 A * | 3/1989 | Gillner ...................... 156/106 |
| 4,911,984 A * | 3/1990 | Parker ....................... 428/428 |
| 5,352,528 A * | 10/1994 | L'Her et al. ................ 428/426 |
| 5,415,909 A * | 5/1995 | Shohi et al. ................. 428/34 |
| 5,496,643 A * | 3/1996 | Von Alpen ................. 428/432 |
| 5,567,529 A * | 10/1996 | Smith ...................... 428/425.6 |
| 5,622,580 A * | 4/1997 | Mannheim .................. 156/106 |
| 5,683,805 A * | 11/1997 | Oita et al. .................. 428/343 |
| 6,242,081 B1 * | 6/2001 | Endo ......................... 428/212 |
| 6,294,251 B1 * | 9/2001 | Minagawa et al. ......... 428/354 |
| 6,352,754 B1 * | 3/2002 | Frost et al. .................. 428/77 |
| 6,410,120 B1 * | 6/2002 | Frost et al. ................. 428/174 |
| 6,432,522 B1 * | 8/2002 | Friedman et al. .......... 428/212 |
| 6,455,141 B1 * | 9/2002 | Woodard et al. ........... 428/214 |
| 6,673,456 B1 * | 1/2004 | Kobata et al. ............. 428/437 |
| 6,833,184 B1 * | 12/2004 | Damnjanovic et al. ..... 428/323 |
| 6,926,786 B1 * | 8/2005 | Frost et al. ................. 156/101 |

FOREIGN PATENT DOCUMENTS

| | | |
|---|---|---|
| EP | 0 287 861 | 10/1988 |
| GB | 590 235 | 7/1947 |
| GB | 857 174 | 12/1960 |
| GB | 1 470 844 | 4/1977 |

* cited by examiner

Primary Examiner—Vivian Chen
(74) Attorney, Agent, or Firm—Oblon, Spivak, McClelland, Maier & Neustadt, P.C.

(57) ABSTRACT

In a composite pane having a film laminate which adhesively connects two rigid panes to one another to form a pane assembly and comprises at least one colored adhesive film and at least one uncolored adhesive film which can be fused on during production of the pane assembly, according to the invention, at least one intermediate layer is provided between the two differently colored fused-on adhesive films and results in a uniform flattening of the mutually facing surfaces of the two adhesive films while being fused on. This results in the finished product being homogeneously colored when being looked through.

9 Claims, No Drawings

LAMINATED GLASS SHEET WITH A LAMINATED FILM

TITLE OF THE INVENTION

Composite pane with a film laminate

BACKGROUND OF THE INVENTION

1. Field of the Invention

The invention relates to a composite pane having a film laminate with the features of the disclosed composite pane.

2. Description of the Background

Composite panes which are intended for installation in vehicle sliding and lifting roofs or else as rear side windows and windscreens for vehicles are known, which are composed essentially of two rigid panes of glass or plastic, and of adhesive films which adhesively connect these two rigid panes to one another. An adhesive film whose bulk is coloured is often used in order to absorb a portion of the light which passes through the composite pane when in the installed state. The acoustic behaviour (silencing) as well as the UV resistance of the final assembly are improved by combination with an uncoloured adhesive film which is clearly transparent in its own right in the final stages. For the latter purpose, the untoned adhesive film faces the incident light or solar radiation (located on the outside) when the composite pane is in the installed state. It absorbs the majority of the incident UV radiation, which could change the colour of the coloured adhesive film in the long term.

The two adhesive films are fused on virtually completely during the final connection of the layers for this composite pane in an autoclave process at about 130 to 150° C. The finished composite pane exhibits a clearly perceptible inhomogeneous cloudy colouring when it is looked through, however, so-called "orange skin". It has been found that the rough and wavy surfaces of the films on the boundary surface between the clear and the coloured adhesive film leads to non-uniform flow phenomena in the autoclave, and to thickness fluctuations, resulting from this, in the films, whose thickness was approximately uniform before being fused, to be precise, irrespective of whether the two films which had been laminated on to one another were originally of the same thickness, or of different thicknesses.

The roughness and corrugation of the film surfaces are on the one hand unavoidable during production, but on the other hand, they contribute to reliable venting of the initial assembly when a reduced pressure is applied. Air which is enclosed between the layers has to be removed, as is known, and in the process flows away through the channels formed by the surface structures.

Composite panes are also known in which a further thermoplastic film, generally composed of PET (polyethyleneterphthalate) is laminated in between two adhesive films in order to increase the thermal insulation, and is itself provided with a coating (which contains metal) which reflects infrared waves. A film composed of a PET-PMMA co-extrudate or co-laminate can also be used without any metal components for the same function (known by the product name 3M® SRF "solar reflecting film").

The problem of different colouring and mixing of the adhesive films does not, of course, occur with these film laminates—with adhesive films of the same colour.

SUMMARY OF THE INVENTION

The invention is based on the object of improving a composite pane of this generic type with a film laminate composed of differently coloured adhesive films such that optical disturbances caused by thickness fluctuations during the fusion process are avoided.

According to the invention, this object is achieved by the features of the disclosed composite pane. The features of the dependent claims indicate advantageous developments of this subject matter.

DETAILED DESCRIPTION OF THE PREFERRED EMBODIMENTS

The undesirable optical effect can be reliably avoided by inserting at least one further intermediate layer between the coloured adhesive film and the clear adhesive film, which further intermediate layer does not change its surface in the autoclave process, and which essentially retains its physical shape, which is produced at the latest after the composite layers have been placed together. The surfaces of the adjacent adhesive films are thus uniformly flattened during the fusion process, and cannot form optically perceptible ripples.

By way of example, the intermediate layer may be a clear PET film, a coated PET film, for example of the Southwall XIR type, a PET-PMMA co-extrudate, for example of the 3M® SRF type, or else numerous other films (for example, composed of PC, PE, PEN, PMMA, PVC), which are optically as highly transparent as possible and whose surface and consistency do not change in the autoclave.

A further major requirement is, of course, that the films which are used as the intermediate layer are compatible with the adjacent adhesive films. In particular, there must be good adhesion between the adhesive films and the intermediate layer in order to avoid any risk of de-lamination. Furthermore, there must be no chemical or physical interactions which could lead to optical or mechanical disturbances during the life of the composite pane.

A further rigid pane could also be inserted as the intermediate layer, preferably but not exclusively an extremely thin glass or plastic pane (for example composed of polycarbonate) which, if required, can even be matched to a slight bending of the two rigid panes of the composite pane without preforming. If the composite pane is flat and/or its total thickness and its weight are less important, then the intermediate layer may also be formed by a rigid glass or plastic pane of normal thickness (a few millimetres).

This intermediate layer embedded in the film laminate in any case results in a defined separating layer or wall, which prevents any undesirable non-uniform flowing process between the two different adhesive films even when these are fused on completely. The composite panes produced in this way are optically very homogeneously coloured when looked through.

In a further variant of the invention, additional toning of the finished product when looked through can also be achieved by suitable colouring of the intermediate layer itself. A coloured intermediate layer in addition to the tone of one adhesive film can result in different colour tones, for example, for complementary matching to surrounding colours (bodywork paint, internal equipment in the vehicle) with high flexibility and reproducibility, even in large-scale production, for composite panes intrinsically with the same configuration, in which case, of course, the basic toning of the coloured adhesive film and the additive toning of the intermediate layer must be carefully matched to one another.

Exemplary Embodiment:

In order to implement the invention, two rigid panes are changed to the desired form in the normal manner (outline and possibly bending contour). The coloured adhesive film and the uncoloured adhesive film are pre-cut appropriately and a thin PET film is inserted between them. The film stack is now placed on one of the rigid panes, and is covered by the second rigid pane. The surfaces of the films are generally cut to be somewhat smaller than the surfaces of the rigid panes. The latter may both be composed of plastic or glass, or a glass pane and a plastic pane may be used.

Once the pane and film stack has been vented with the aid of suitable apparatuses, the initial assembly is subjected to heat and pressure treatment in an autoclave process. During this process, the adhesive films are fused on completely and are closely and adhesively connected to the respective adjacent surfaces of the rigid pane and of the intermediate layer.

The circumferential edge gap between the two rigid panes in the plane of the film laminate is sealed by suitable means in a manner known per se, in order to prevent de-lamination starting from this point.

Alternately, instead of being placed together before being connected, the film laminate can also be taken from an initial production phase, after which either one of the adhesive films is pre-laminated with the intermediate layer, so that the second adhesive film just has to be placed on it, or all three film layers are brought together at this stage and just have to be cut to match the rigid panes.

Pre-laminates such as these are used in particular when the intermediate layer is in the form of a coated PET film, with the coated main surface being covered with an adhesive film shortly after the coating process, in order to prevent damage to the sensitive multiple layer or layer system.

The invention claimed is:

1. A composite pane, comprising:
two rigid panes that are bonded together by an intervening assembly consisting of (i) at least one colored adhesive film and (ii) at least one uncolored adhesive film, each having a thickness ranging from 0.2 to 1.1 mm and at least one of which is a thermoplastic that does not contain a softener, and (iii) at least one intermediate layer of a rigid pane of glass or plastic having a thickness ranging from 10 to 100 µm positioned between the adhesive layers, at least one of which is thermoplastic ethylene vinyl acetate (EVA), which effectively fuses to each of the adhesive layers such that the fusion bonding results in a uniform flattening of the mutually facing surfaces of the two adhesive films during production of the pane assembly.

2. The composite pane according to claim 1, wherein the amount of the visible light transmitted through the coloured adhesive film in the finished product ranges from 1 and 85%.

3. The composite pane according to claim 1, wherein the intermediate layer is formed of a PET film.

4. The composite pane according to claim 1, wherein the intermediate layer is formed of a metal-free film which reflects infrared waves.

5. The composite pane according to claim 1, wherein the two adhesive films each have a thickness ranging from 0.38 and 0.76 mm.

6. The composite pane according to claim 1, wherein at least one of the adhesive films is composed of polyvinylbutyral.

7. The composite pane according to claim 1, wherein at least one of the adhesive films is composed of polymethylmethacrylate (PMMA).

8. The composite pane according to claim 1, wherein the intermediate layer is self-colored.

9. The composite pane according to claim 8, wherein the color tone of the intermediate layer, together with the color tone of the colored adhesive layer results in a transparent color which is determined by the color of the adhesive film.

* * * * *